United States Patent Office 3,289,725
Patented Dec. 6, 1966

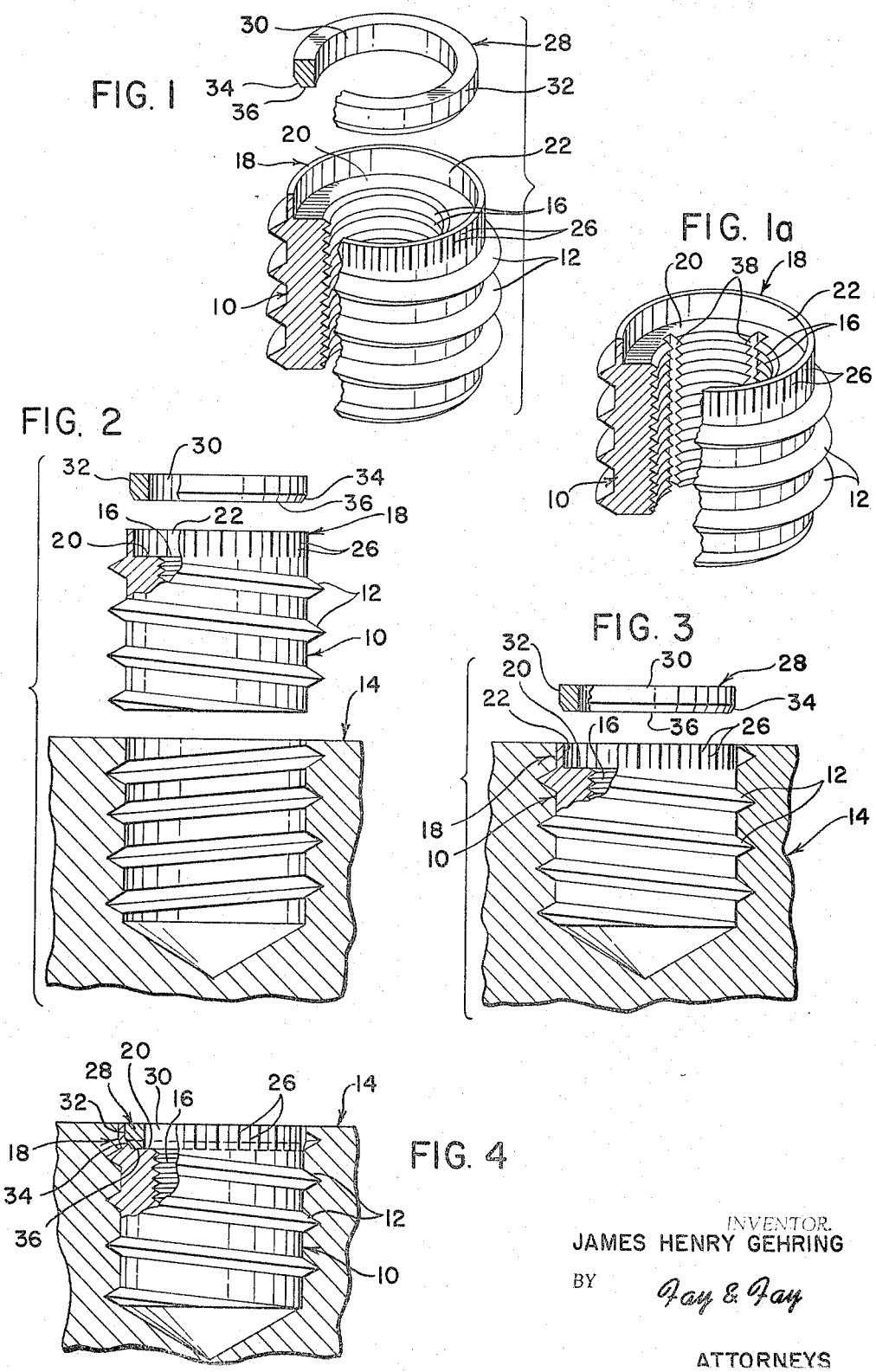

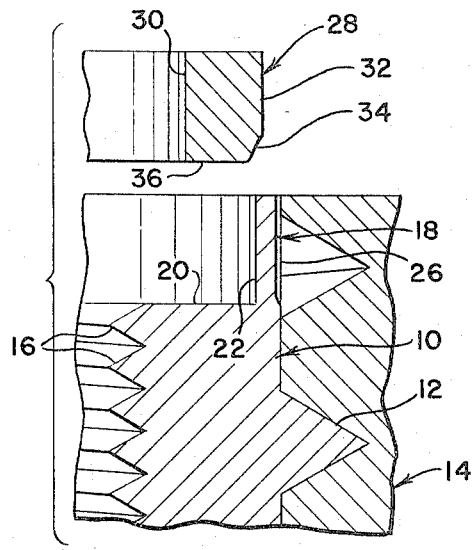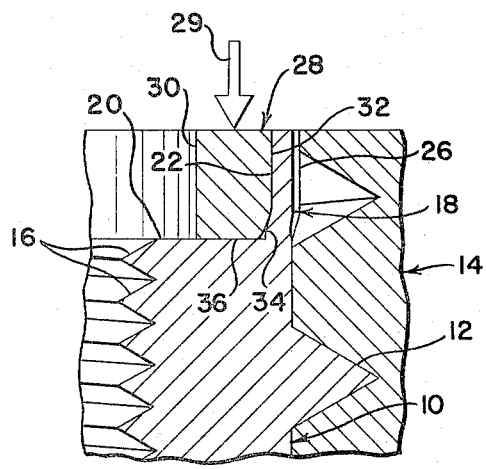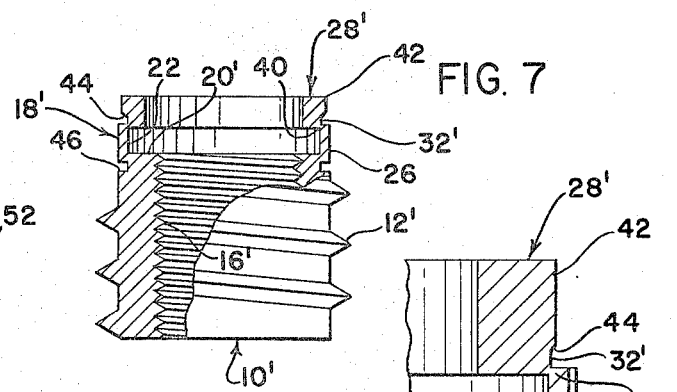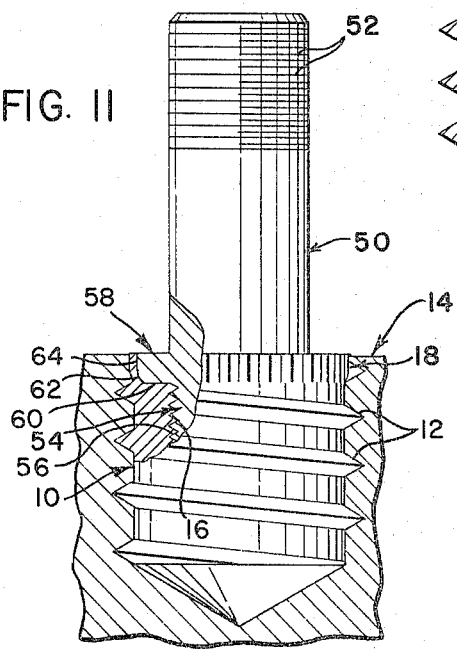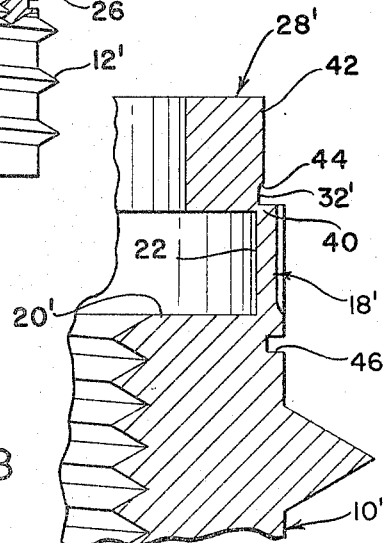

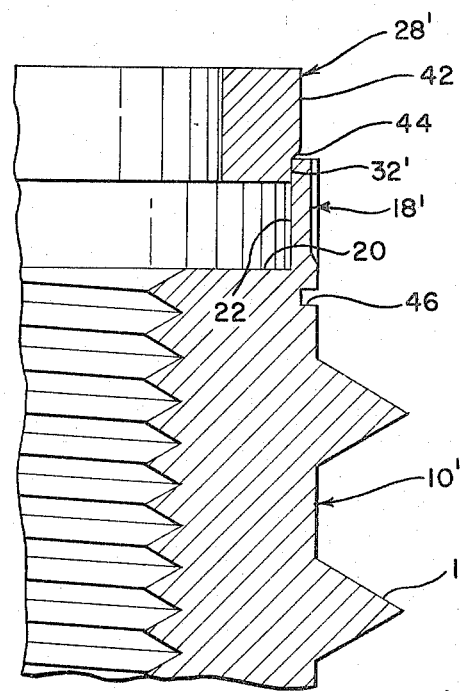
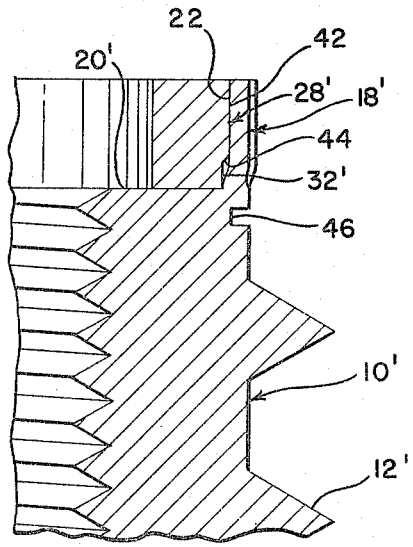

3,289,725
INSERT
James Henry Gehring, 4080 N. Sagamore Drive,
Fairview Park, Ohio
Filed Dec. 21, 1964, Ser. No. 420,035
10 Claims. (Cl. 151—41.72)

This invention generally relates to inserts adapted to be secured in a body of parent material to provide a secure anchorage for a connecting means which is received by the insert. More particularly, this invention relates to a threaded insert, which has exterior threads adapted to be received by a threaded bore in the parent material, and internal threads which are adapted to receive the external threads of a connecting means, such as a stud, or bolt, or equivalent means. Still more particularly, this invention relates to a threaded insert which incorporates a novel concept for securing the insert in the bore of the parent material.

Such materials as aluminum, magnesium, plastic, and other synthetic materials, are being used more and more in the manufacture of various structures. While most of these materials lend themselves to modern manufacturing methods and techniques and are desirable from the standpoint of weight, cost, corrosion, durability, etc., most of these materials are generally softer and have lower shear strength than conventional ferrous and other metallic materials, and problems prevail in providing secure connections or anchoring means, such as threaded holes, for the purpose of securing other structures thereto. While these materials can be bored and tapped to provide a threaded connecting means, this is often unsuitable because the threads are easily stripped or sheared and also become easily damaged.

The conventional solution to this problem has been to provide an insert which amounts to a generally cylindrical object, made from any suitable material, such as a ferrous alloy, or brass, having external threads of a design to cooperate with the corresponding threads of the parent metal to provide maximum strength.

Of the many designs of inserts which have been and are being used, all have been possessed with problems in connection with the assembling of the insert into the parent metal; failure during actual use; or serious problems in connection with the extraction of the insert, and replacement thereof.

A major problem in connection with the assembling of the insert into the parent material is that of locking the insert securely in place to retain it from rotation during subsequent use. It is apparent that the insert must be securely retained against rotation to allow the threading and unthreading of other connecting members therein.

A known method of securing an insert in a base or parent metal is typified by U.S. Patent No. 2,400,318, to J. Rosan. This technique involves providing the outer end of the insert with a plurality of external, longitudinal serrations or ribs. A locking ring, provided with internal, longitudinal serrations is adapted to mesh with the similar outer serrations on the end of the tubular insert body, and external serrations designed to cut or broach their way into the material of the body, is driven over the insert. By this technique the external serrations on the insert itself are interconnected with the internal serrations on the locking ring and the external serrations on the locking ring are in turn secured to the parent metal. This method has serious limitations inasmuch as it is expensive, requiring two parts, three series of serrations, actual cutting of the parent or base metal, and can be extracted only by drilling same out of the hole, which requires a redrilling and retapping to replace the insert.

Another known method of securing the insert into the base material involves providing the external threaded surface of the insert with one or more flutes or keyways. After the insert has been screwed into the metal part, a key is driven through the keyway and actually severs or broaches that portion of the threads of the parent metal which extend into the keyway. This is not entirely satisfactory since it involves a sacrifice of thread shear area, presents great difficulties in removing the insert for replacement, and also necessitates an oversized redrilling and retapping of the hole in order to provide a replacement part.

It should be noted that both of the foregoing methods of securing the insert into the parent metal involves a shearing or broaching of the parent metal. Also, in both of these techniques a locking member is driven longitudinally of the hole.

In general, the insert of this invention comprises an insert having external threads of a design to provide maximum shear strength in cooperation with the threads of the bore in the parent material, and an externally serrated locking collar which is radially expanded by driving a radial wedge or locking ring thereinto to thereby secure the insert in the bore of the parent material. The locking ring or radial wedge which is driven longitudinally with respect to the insert may be a separate part, or manufactured as an integral part of the insert and separable therefrom as it is driven into the locking collar to radially expand the latter into the parent material. The locking ring or radial wedge which serves primarily to expand the locking collar into gripping engagement with the bore of the parent metal, also serves as a pilot to assist in accurately threading a connecting means insert.

In removing this insert from the parent metal, the locking ring is easily extracted with a screwdriver or equivalent instrument, thereby allowing the locking collar to contract slightly and withdraw from bearing engagement with the bore. The insert may then be easily backed out and replaced with another, without any requirement for reboring or retapping the hole.

The insert of this invention is simple, economical to manufacture, is used without any shearing or broaching of the parent metal, and can be easily removed and replaced without the requirement for refinishing the threaded bore in the parent or primary structure.

The insert of this invention is also suitably adapted to be used in threaded openings which have been prepared for use in connection with the prior art type of inserts. In this regard, it should also be noted that many of the prior art devices required a particular type of counterboring to accommodate the insert being used, but in using applicant's device, it is not necessary to counterbore to provide a means to accommodate the locking device. On the contrary, in using applicant's device it is not necessary to make provision for a locking ring or collar or some other locking feature, but it is only necessary to drill and tap the hole.

With the foregoing in mind, it is an object of this invention to provide a threaded insert which is easily and economically manufactured.

It is another object of this invention to provide a threaded insert which is easily installed into a threaded bore of the parent material.

It is another object of this invention to provide a threaded insert which can be securely installed into the parent material by merely drilling and tapping a threaded bore therein.

Another object of this invention is to provide a threaded insert which may be securely installed in a bore of the parent metal which has been drilled and tapped only, as well as in a bore that has been counterbored.

Another object of this invention is to provide a threaded insert which may be easily and securely installed in a threaded bore of the parent material without cutting, shearing, or deforming the base or parent material.

A still further object of this invention is to provide a threaded insert which has uninterrupted exterior threads to thereby provide the maximum shear strength.

A further object of this invention is to provide a threaded insert which may be securely fastened in the threaded bore of a parent material without damaging the threads in any way.

Another object of this invention is to provide a threaded insert which may be easily removed from the parent material without the requirement of drilling out the insert.

Another object of this invention is to provide a threaded insert to be securely fastened in a threaded bore of the parent material, which may be replaced without the requirement of any drilling, or tapping, or refinishing of the threaded bore.

A still further object of this invention is to provide a threaded insert adapted to be secured in a threaded bore of a parent material, comprising a unitary member having a terminal portion thereof radially expandable into gripping engagement with the bore of the parent material by means of a radial wedge or annular locking ring.

These and other objects of this invention will become apparent by consideration of the detailed description which follows:

Referring now to the drawings:

FIG. 1 is an exploded perspective view, partially broken away of the novel insert;

FIG. 1a is a perspective view, partially broken away, of a preferred embodiment of the invention incorporating an alternative means for applying torque to the insert for threading it into the parent metal;

FIG. 2 is an exploded elevation, partially broken away, showing the arrangement prior to assembling in a suitable bore;

FIG. 3 is a view similar to FIG. 2 showing the insert threaded into the blind bore;

FIG. 4 is an elevational view, partially broken away, showing the locking ring in the position which it assumes after radially expanding the locking collar of the insert into gripping engagement with the parent material;

FIG. 5 is a fragmentary, enlarged view of FIG. 3;

FIG. 6 is a fragmentary, enlarged view of FIG. 4;

FIG. 7 is a sectional view of a modified form of the novel insert of the invention;

FIG. 8 is an enlarged fragmentary view of FIG. 7;

FIG. 9 is an enlarged fragmentary sectional view of the insert of FIG. 7, showing the arrangement of parts as they appear in a partially assembled condition;

FIG. 10 is a view similar to FIG. 9 showing the arrangement of parts as they appear when the insert is properly secured in a parent material;

FIG. 11 is an elevational view partially broken away showing a modified form of insert to be used in connection with a stud, wherein the locking ring is formed as an integral part of the stud or connection means.

Referring now, more particularly, to FIGS. 1 to 6 of the drawings, the insert comprises a generally cylindrical body member, generally indicated at 10. The body member has external threads 12 to be received by similar internal threads in the material of the parent body generally indicated at 14. The body member 10 is provided with an internal bore or aperture including internal threads 16. The threads 16 are adapted to received a member which is to be connected to the parent material 14. The threads 12 may be of any configuration desired but it is preferred to use a design which will give the maximum shear strength.

While the threads illustrated in the drawings are of the type that are designed to be received into a threaded bore, it is also contemplated that self-tapping threads may also be used if desired.

The threads 12 extend from one extremity of the insert and extend therealong toward the other extremity. The insert securing means or locking collar 18 defines the other extremity of the insert and extends therealong toward the first end.

It has been found that the design of thread illustrated in the drawing is preferred to give maximum shear strength between the insert and parent material. The internal threads may be of any preferred type as dictated by the threads or other type of fastening means, of the part which is to be fastened therein. While the body member is illustrated as having an aperture extending therethrough and completely threaded since this is preferred from the standpoint of efficient manufacturing techniques, it is possible to employ blind threaded bores in the body member.

On the upper extremity of the body member, there is provided a generally annular shaped locking collar 18. The generally concentric locking collar is formed by counterboring the end of the body member to form an annular shoulder 20 disposed between the bore or aperture and the inner surface 22 of the locking collar. The locking collar 18 is relatively thin-walled, as will be discussed in more detail hereinafter, and is provided with protuberances or irregularities 26, such as serrations. These protuberances might also be formed by knurling, or an equivalent means, so long as they are of a suitable design and formed with a sufficient depth to produce a gripping action in the parent material 14.

A locking ring, generally indicated at 28, is provided for use in connection with this insert. The locking ring 28 is generally annularly shaped and is provided with smooth inner and outer surfaces 30 and 32 respectively. The locking ring 28 is preferably provided with a chamfered surface 34 between the outer surface 32 and the lower side 36.

As will be discussed in more detail hereinafter the locking ring 28 is axially forced to a position within the confines of the locking collar and a suitable means is required to start the entrance of the ring into the collar. A chamfer is easier and cheaper to make but other means are suitable.

Referring more particularly to FIG. 5, it will be noted that the surface 34 intersects surface 36 to define a diameter just slightly less than the inner diameter of the annular shoulder 20. It will also be noted that the outer surface 32 of the locking ring is of a diameter slightly in excess of the diameter of the inner surface 22 of the locking collar.

In using the preferred embodiment of this insert, the parent material 14 is drilled and tapped in a conventional manner with threads corresponding to the threads on the insert. The body of the insert is then threaded into the parent material, as illustrated by FIGS. 2 and 3. It should be noted in this regard that it is not necessary to provide the bore in the parent material with a counterbore of any type to accommodate a locking means to secure the insert.

The body of the insert may be threaded into the parent material by any suitable means. In the embodiment illustrated by FIG. 1, for example, a tool comprising a threaded mandrel would be used. The body of the insert 10 would be threaded onto the mandrel and the mandrel in turn used to manipulate the insert and thread same into the parent material. In an alternative embodiment of the invention, as illustrated in FIG. 1a, the bore of the body of the insert would be provided with a plurality of flutes or keyways 38. Any particular number of keyways might be used but for four equally spaced keyways have been found suitable.

In threading the insert of FIG. 1a into a parent metal, the insert would be axially placed on a mandrel, which would include the proper number of properly spaced keys to be received into the keyways 38. This tool would then be manipulated in connection with the threaded bore of the parent material to thread the thread thereinto. The torque would be transmitted to the insert via the keyways and when the insert is properly threaded into the parent material, the tool is extracted by merely moving same axially of the insert. This latter technique is sometimes preferred inasmuch as it reduces assembly time since the threading and unthreading steps are eliminated.

With the body of the insert threaded into the parent material to the proper extent, the annular locking collar 18 will preferably be at or below the upper surface of the parent material. The depth of the tapped hole in the parent material is not critical inasmuch as no damage will be done if the insert is threaded into an extent which would place the upper extremity somewhat below the surface of the material. The relationship between the internal threads of the parent material and the external threads on the body of the insert are selected so that the insert is not under stress when it is threaded into the parent material.

After the body of the insert has been threaded into the parent material, the locking ring 28 is forced down into the inner surface of the locking collar 22 as indicated by the arrow 29 in FIG. 6. A suitable impact means is used for this purpose. As illustrated in FIGS. 4 and 6, the locking ring has served to radially expand the locking collar and force the protuberances or serrations thereon into gripping engagement with the parent material. The parent material, being somewhat softer than the material from which the insert is made, will be distorted at the crests of the protuberances or serrations and forced radially inwardly toward the lower points or roots of the serrations. It is this locking engagement between the parent material and the locking collar which serves to secure the insert against rotation when other elements are threaded into and out of the internal threads 16 of the insert.

The locking ring 28 is selected from a material, and properly dimensioned, to assure that the locking collar is sufficiently expanded radially to securely engage the parent material. In a typical embodiment, the insert body would be made from a conventional ferrous material and the locking ring would be made from a high alloy chrome and nickel material. The parent material would, of course, be softer than either of the foregoing materials and in a typical embodiment would be a relatively soft metal, such as aluminum, or magnesium, or a synthetic resinous material.

After the insert is assembled into the parent metal, the locking ring functions to maintain the locking collar in its radially expanded position, and also as a pilot member to assist in threading the member to be connected into the threads 16. Preferably, the locking collar is distorted beyond its elastic limit, and held in an expanded position by the locking ring.

The depth of the locking collar is illustrated as being substantially the same as the thickness of the locking ring. However, under certain conditions of vibration, it is preferred to make the depth of the locking collar slightly greater than the thickness of the locking ring so that when the ring bottoms on the shoulder 20 the upper peripheral portion of the collar will contract slightly. This, in effect, provides a means of retaining the locking ring in the locking collar to maintain the collar in its radially expanded position and securely retaining the insert in place.

If a stud, or equivalent means is to be threaded into the bore of the insert it may be provided with a radial flange to overlay the ring and maintain it properly within the locking collar. In general, however, the locking ring remains secured in the locking collar without resort to ancillary means.

To remove the insert from the parent material, in the event of damage or for any other reason, an instrument, such as a screwdriver is inserted between the lower surface 36 of the locking ring and the shoulder 20 of the insert, and canted toward the insert to thereby extract the ring. An "easy-out" tool is then threaded into the bore of the body member 10 and used to extract it.

When the locking ring is extracted from the locking collar, the latter contracts very slightly. When the body begins to unthread from the bore as the easy-out is turned counter-clockwise, the relatively thin-walled locking collar generally will shear from the body and be forced longitudinally from the bore. Often the collar collapses and is forced from the bore by the body member.

Many inserts can be threaded into and removed from the same bore without damaging the threads in the parent material. This is done without the necessity for redrilling and retapping an oversized bore. In this regard it should be noted that there is no significant cutting, or shearing, or broaching, or removal of material by the protuberances or serrations 26. It should also be noted that the threads of the parent material are not damaged by the insertion of a key or equivalent means as is noted as being conventional in certain prior art inserts.

The body of the insert and the locking ring may be provided either as a unit or as separate elements of the insert. In certain circumstances, it is preferred to provide a device, such as illustrated in FIGS. 1 to 6, with the locking ring attached to the upper portion of the locking collar by a transitory or frangible adhesive means, such as an epoxy resin. This assures that the locking ring is properly aligned with the locking collar upon impact. The locking ring may also be made integral with the locking collar but severable therefrom as described in more detail hereinafter in connection with FIGS. 7 to 10.

While the preferred embodiment of the insert of this invention has been described for use in connection with a newly drilled and tapped bore in the parent piece of metal, it also may be used in connection with existing counterbored openings prepared for use in connection with inserts of the type shown and described in U.S. Patent No. 2,400,318 to Rosan. To use the insert of this invention in a previously counterbored opening, the external diameter of the locking collar 18 would be selected to be radially expanded into locking engagement with the wall of the counterbore. In this regard, it is noted that the previously counterbored hole would not need reboring or retapping to use the insert of this invention, inasmuch as the insert of this invention utilizes a locking technique which does not shear or broach any of the parent metal.

Referring now to FIGS. 7 to 10, there is illustrated a modified form of the invention. This form of the invention comprises a body member generally indicated at 10', which includes collar 18', similar in design and function to the locking collar 18 of the preferred embodiment, is formed integrally with the body of the insert. The locking collar is provided with external surface protuberances or serrations 26' of a nature similar in function and construction to the protuberances or serrations 26 of the preferred body. The insert is made by undercutting the inner surface 22 of the locking collar to a point about equal to or slightly greater than the diameter of the outer surface 32' of the locking ring 28'. A small amount of material 40, as clearly indicated in FIG. 8, is left remaining to secure the locking ring to the locking collar. The locking ring 28' of this embodiment is of the stepped character, comprising a first diameter 32', and a second diameter 42, joined by an inclined or wedging surface 44.

Referring now to FIG. 9, it will be noted that when impact is applied to the locking ring 28', it is severed from the locking collar. As the locking ring moves farther down into the interior of the locking collar, the latter is expanded by means of the wedging surface 44, allowing the larger diameter portion 42 to move into and expand the collar into locking engagement with the parent material. The insert is securely fastened into the parent material when the bottom portion of the locking ring seats upon the shoulder 20'.

The embodiment of the insert illustrated by FIGS. 7 to 10, may also be provided with an undercut portion 46 on the exterior of the body member to facilitate separation of the locking collar from the body of the insert in the event that the former freezes to the parent metal. In removing this insert from the parent metal, a relatively sharp instrument is placed into the interior of the locking ring and canted to thereby pry the locking ring from the assembly. If the collar is not frozen to the parent metal the insert is removed in the manner described above.

In the event that the locking collar has fused to the parent material, a similar instrument would be used to sever the metal between the undercut portion 46 and the locking collar thereby releasing the collar from the body. This embodiment of the invention may be assembled into the parent metal by the alternative means discussed above. The locking ring serves a similar function of retaining the locking collar in a radially expanded position in gripping engagement with the parent metal as well as a pilot member to facilitate assembly of another element into the insert.

This insert possesses advantages similar to the preferred embodiment in that no shearing or broaching of the parent metal is required to assemble the insert; and the insert may be replaced numerous times without the necessity of reboring or retapping the hole. In addition, this insert may be assembled with the parent metal by merely drilling and tapping a hole and does not require any counterboring. It may, however, be designed to be used in connection with bores that have been prepared for use with the prior art devices by designing the insert of the instant invention accordingly.

FIG. 11 shows an alternative form of the invention that may be used in connection with a stud. This form of the invention distinguishes from the form illustrated in FIGS. 1 to 6 in that the locking ring is formed in an integral portion of the stud which is threaded into the bore of the body member. The insert body member used in connection with this embodiment is similar in structure to the device shown in FIGS. 1 to 6 and is numbered correspondingly. The stud includes a cylindrical body 50, having external threads 52 at the outer extremity thereof to receive members to be secured to the parent material. The other end 54 of the stud includes threads 56 adapted to cooperate with the internal threads 16 of the insert body. Integral with the stud 50 and disposed between the ends thereof is an annularly protruding flange generally indicated at 58. The flange 58 is defined by a lower shoulder 60, a chamfered portion 62, extending between the lower shoulder 60 and the side surface 64. The chamfered portion 62 at the side or circumferential surface 64 coacts with the locking collar 18 in a manner similar to the coaction between the locking ring 28 and the locking collar 18 of the embodiment shown in FIGS. 1 to 6.

It will be understood that the description and drawings of this invention are merely illustrative and that various modifications may be made without departing from the spirit and scope of the invention as defined by the appended claims.

The invention claimed is:

1. A replaceable insert adapted to be received into an opening in a parent material comprising a generally cylindrical body member of a material characterized as exhibiting the property of slight spring back when released after being stressed beyond its elastic limit, external threads on the first end of the body member adapted to be received in said opening, a generally cylindrical bore in said body member, fastening means in said bore adjacent said first end of the body member adapted to receive a connection means and secure same to said body member, a generally annular radially expandable locking collar defining the second end of the body member and substantially concentric therewith, said locking collar having irregularities on the outer surface thereof adapted to grippingly engage the walls of the parent material forming said opening and secure said insert against rotation in the parent material, the outside diameter of the locking collar being no greater than the root diameter of the external threads on said first end of the body member, said locking collar having a generally smooth inner surface, a generally annular shoulder extending between the inner surface of said locking collar and said bore, and a generally annular locking ring having an outside diameter slightly greater than the inside diameter of the locking collar and dimensioned to be forcibly received therein to expand the locking collar into bearing relationship with said walls to thereby cause said collar to grippingly engage the walls, so that the locking collar will contract slightly upon removal of the locking ring therefrom and withdraw from said gripping engagement, thereby allowing the insert to be received by, secured in, and removed from the opening in the parent material without substantial deformation of said walls.

2. The insert of claim 1 further characterized in that the fastening means in the bore are threads.

3. The insert of claim 2 further characterized in that the bore is provided with a plurality of keyways to axially receive and release a torque applying means.

4. A replaceable insert to be received into an opening in a parent material comprising a generally cylindrical body member having a first end and a second end, said body member being constructed of a material characterized as exhibiting the property of slight spring back when released after being stressed beyond its elastic limit, external threads on the body member extending from said first end toward said second end, an aperture in said body member generally coaxial therewith, internal threads in said aperture extending from said first end toward the second end, and adapted to receive a connection means, a generally coaxial annular shaped locking collar defining the second end of the body member and extending toward the first end thereof, the outside surface of said locking collar having protuberances thereon adapted to grippingly engage the walls of the parent material forming said opening, the inside diameter of the locking collar being greater than the diameter of the aperture, the outside diameter of the locking collar being no greater than the root diameter of the external threads on the body member, a surface defining an uninterrupted shoulder extending between the inner surface of the locking collar and the aperture, a locking ring adapted to be received into the locking collar, said locking ring being generally annually shaped and concentric with said aperture and said locking collar, said locking ring having an inner diameter greater than the diameter of the aperture to thereby serve as a pilot means for a connection means and an outer diameter slightly greater than the inside diameter of the locking collar and dimensioned to be forcibly received into the inner surface of the locking collar to radially expand the locking collar into bearing relationship with the walls of the parent material forming said opening to thereby cause said collar to grippingly engage said walls, so that the locking collar will contract slightly upon the removal of the locking ring therefrom and withdraw from said gripping engagement, thereby allowing the insert to be received by, secured in, and removed from the opening in the parent material without substantial deformation of said walls.

5. The insert of claim 4 further characterized in that the locking ring is secured to the outer extremity of the locking collar by a securing means prior to being received within the locking collar to radially expand same.

6. The insert of claim 4 further characterized in that the locking ring is integrally formed with the outer extremity of the locking collar prior to being received within the locking collar to radially expand same.

7. The insert of claim 4 further characterized in that the connection means is a stud fastening means having the locking ring integral therewith.

8. A replaceable insert threadedly received into an opening in a parent material comprising a generally cylindrical body member having a first end and a second end, said body member being constructed of a material characterized as exhibiting the property of slight spring back when released after being stressed beyond its elastic limit, external threads on the body member extending from said first end toward said second end, an aperture in said body member generally coaxial therewith, internal threads in said aperture extending from said first end toward the second end, and adapted to receive a connection means, a generally coaxial annular shaped locking collar having an outside diameter no greater than the root diameter of the external threads on the body member defining the second end of the body member and extending toward the first end thereof, the outside surface of said locking collar having protuberances thereon, the inside diameter of the locking collar being greater than the diameter of the aperture, a shoulder defining a surface extending between the inner surface of the locking collar and the aperture, a locking ring forcibly received in said locking collar and serving to maintain the locking collar in a radially expanded condition in bearing relationship with the walls of the parent material forming said opening to thereby cause the collar to grippingly engage said walls, so that the locking collar will contract slightly upon removal of the locking ring therefrom and withdraw from said gripping engagement, thereby allowing the insert to be received by, secured in, and removed from the opening in the parent material without substantial deformation of said walls.

9. The insert of claim 8 further characterized in that the locking ring is secured to the outer extremity of the locking collar by a securing means prior to being received within the locking collar to radially expand same.

10. The insert of claim 8 further characterized in that the locking ring is integrally formed with the outer extremity of the locking collar prior to being received within the locking collar to radially expand same.

References Cited by the Examiner
UNITED STATES PATENTS

| | | | |
|---|---|---|---|
| 2,151,171 | 3/1939 | Thomas et al. | 151—141.72 |
| 2,370,327 | 2/1945 | Rosan | 151—41.72 |
| 2,577,810 | 12/1951 | Rosan | 151—41.72 |
| 2,967,593 | 1/1961 | Cushman | 29—523 |
| 3,081,808 | 3/1963 | Rosan et al. | 151—41.73 |
| 3,179,144 | 4/1965 | Brown | 151—41.73 |
| 3,220,454 | 11/1965 | Neuschotz | 151—41.72 |
| 3,236,143 | 2/1966 | Wing | 151—41.73 |
| 3,247,878 | 4/1966 | Rosan et al. | 151—41.73 |

CARL W. TOMLIN, *Primary Examiner.*

M. PARSONS, JR., *Assistant Examiner.*